(12) United States Patent
Reissenweber

(10) Patent No.: US 7,278,288 B2
(45) Date of Patent: Oct. 9, 2007

(54) METHOD AND DEVICE FOR TRANSFERRING A WORKPIECE

(75) Inventor: Frank Reissenweber, Sesslach (DE)

(73) Assignee: Langenstein & Schemann GmbH, Coburg (DE)

( * ) Notice: Subject to any disclaimer, the term of this patent is extended or adjusted under 35 U.S.C. 154(b) by 0 days.

(21) Appl. No.: 11/186,337

(22) Filed: Jul. 21, 2005

(65) Prior Publication Data

US 2006/0065036 A1  Mar. 30, 2006

(51) Int. Cl.
*B21D 22/00* (2006.01)
*B21J 11/00* (2006.01)
*B21J 13/10* (2006.01)

(52) U.S. Cl. .................. 72/361; 72/405.09; 72/420

(58) Field of Classification Search ............... 72/361, 72/420–422, 379.4, 348, 356, 405.09, 405.12; 29/418; 414/806; 901/8; 83/914
See application file for complete search history.

(56) References Cited

U.S. PATENT DOCUMENTS

| | | | | |
|---|---|---|---|---|
| 3,660,391 A * | 5/1972 | Wilson | .................. | 544/116 |
| 3,685,070 A * | 8/1972 | McClellan et al. | ......... | 470/139 |
| 3,713,320 A * | 1/1973 | Andresen | .................. | 72/361 |
| 3,793,872 A * | 2/1974 | Logan | ....................... | 72/422 |
| 3,824,833 A * | 7/1974 | Bachmann | ................. | 72/361 |
| 3,848,452 A * | 11/1974 | Gargrave | .................. | 72/448 |
| 4,227,394 A * | 10/1980 | Heimel | ..................... | 72/356 |
| 4,449,390 A | 5/1984 | Pontini | | |
| 4,491,451 A * | 1/1985 | Willim | ..................... | 414/732 |
| 4,549,425 A * | 10/1985 | Wisebaker et al. | ......... | 72/422 |
| 4,586,365 A * | 5/1986 | Henkelmann | ............. | 72/405.13 |
| 4,733,552 A * | 3/1988 | Lefils | ........................ | 72/405.06 |
| 5,144,709 A * | 9/1992 | Rooney | ..................... | 72/335 |
| 6,125,683 A * | 10/2000 | Toeniskoetter | .............. | 72/426 |
| 6,837,087 B2 * | 1/2005 | Kleber et al. | ................ | 72/60 |
| 2006/0123871 A1 | 6/2006 | Reissenweber | | |

FOREIGN PATENT DOCUMENTS

| | | |
|---|---|---|
| DE | 3148652 A1 | 12/1981 |
| DE | 3323359 C2 | 6/1983 |
| DE | 69001333 T2 | 8/1990 |
| DE | 69004543 T2 | 12/1990 |
| DE | 19754974 C1 | 12/1997 |
| DE | 10152281 B4 | 12/2001 |
| DE | 20311306 U1 | 9/2003 |

\* cited by examiner

*Primary Examiner*—Derris H. Banks
*Assistant Examiner*—Teresa M. Bonk
(74) *Attorney, Agent, or Firm*—Workman Nydegger

(57) ABSTRACT

Aspects of the invention relate to a method and a device for transferring workpieces. In the method, at least one first handling device positions and/or securely holds at least one workpiece in a working region of a shaping machine, and, in at least one shaping process in the shaping machine, the at least one first handling device subsequently transfers the workpiece to at least one second handling device. The at least one workpiece is then aligned in a predetermined (or predeterminable) position when it is received by the at least one second handling device with the assistance of the at least one positioning means and a positioning aid.

27 Claims, 3 Drawing Sheets

METHOD AND DEVICE FOR TRANSFERRING A WORKPIECE

CROSS-REFERENCE TO RELATED APPLICATIONS

This application claims the benefit of priority under 35 U.S.C. § 119 to German Patent Application No. 10 2004 035 797.8, filed on Jul. 23, 2004, entitled "Verfahren und Vorrichtung zum Üerführen eines Werkstücks", which is incorporated herein by reference in its entirety.

BACKGROUND OF THE INVENTION

1. The Field of the Invention

The invention relates to a method and a device for transferring workpieces.

2. Background and Relevant Art

A process for manufacturing metallic products may comprise one or more shaping processes and additional machining processes for a workpiece. Often during a shaping process, not only is the desired product shape obtained, but the workpiece may also include other areas necessary for the shaping process or that result therefrom which must be subsequently removed from the actual product. For the particular processes, the workpiece must then be transferred from one shaping machine to another shaping machine or another processing machine. The problem on which the invention is based is explained below, using the example of a shaping process using drop-forging, which however does not limit the invention thereto.

In drop-forging, the workpiece is brought into the desired shape using a shaping machine having precisely operated hollow mold tools. During shaping of the workpiece blank in the hollow mold tool, excess material is outwardly displaced from the mold, and a projection or peripheral burr may form on the forged workpiece, which is then removed from the actual product in further processing. For this reason the drop-forging is usually followed by a deburring device to remove the peripheral burr.

During the shaping process for the forging and deburring, the workpieces to be processed must be transferred from a forging device to at least one deburring device. For automated handling of the workpieces, handling devices such as manipulators and industrial robots are known which have grippers for grasping and temporarily holding the workpieces, and which insert the workpieces into or remove them from the shaping machine. Manipulators are manually controlled movement devices generally having particular process-specific controls or programs. Industrial robots are universally applicable automated movement devices having a sufficient number of degrees of freedom of motion and a freely programmable control.

An automated unit for drop-forging and deburring of metal parts is known from DE 31 48 652 A1. This reference discloses, for example a vertical press and a deburring press operated by two robot pairs, the one pair being provided with individual horizontal arms and the other pair provided with two horizontal arms opposing one another at an angle of 180°, and each having end pincers. The robot pair having the two opposing arms is able to rotate by 180°, and is provided for placing the metal on the solid die part after it exits the oven and/or for removing the lifted drop-forged piece and placing it between the plates of the deburring machine. The workpiece is moved from the drop-forge to the deburring machine by gripping the workpiece at the peripheral burr produced during forging, and moving the robot in the direction of the deburring machine while the arm rotates by 180°. The other robot pair is provided for moving the workpiece during the forging process.

This device has a very complicated design because separate robot pairs are provided in each case for loading the machines and for the forging process. In addition, due to the need for accessibility by the robotic arms which are rotatable by 180°, the possibilities for configuring the machines in the unit are limited.

The device known from DE 203 11 306 U1 for shaping a workpiece by automatic handling comprises at least one shaping machine having at least two tools which are movable relative to one another for shaping a tool in a predetermined (or predeterminable) shaping position during at least one shaping step, and at least two handling devices for securely holding the workpiece in the shaping position during the shaping step—and thus also when the tool(s) strike(s) the workpiece. In addition to holding the workpiece during shaping, the handling devices may also perform other handling operations such as shifting the workpiece from one working region of a shaping machine to a next working region, or from one gravure of a tool to a next gravure, or from one shaping position to a next shaping position, rotating or swiveling the workpiece, in particular for changing a shaping position, picking up the workpiece from a pickup device, or conveying the workpiece to or from the shaping machine, in particular to a deposit station.

By use of the device described in DE 203 11 306 U1, a workpiece can be securely held and conveyed by only one handling device. If the shaping process is followed by an additional machining process, such as deburring of the workpiece, in practice, the workpiece is deposited on a deposit station, such as a swivel arm, by the handling device responsible for the shaping process. The swivel arm then moves into a transfer position for an additional handling device for the additional machining process, and the workpiece is taken from the deposit station in this transfer position and positioned in the appropriate machine. However, transferring the workpiece by means of a swiveling deposit station can be complicated, and also relatively time-consuming.

BRIEF SUMMARY OF THE INVENTION

Implementations of the present invention overcome one or more of the foregoing problems in the prior art with apparatus and methods for transferring workpieces. These implementations are outlined with particularity in the independent claims, while advantage embodiments and refinements are found in the respective claims depending therefrom.

In a method according to the claims for transferring workpieces, at least one first handling device positions and/or securely holds at least one workpiece in a working region of a shaping machine, and in at least one shaping process in the shaping machine at least one first handling device then transfers the workpiece to at least one second handling device. In the shaping process, at least one positioning aid, in particular at least one projection and/or at least one recess, is now produced on at least one workpiece, which cooperates with at least one positioning means for the second handling device.

The device according to the claims for transferring workpieces comprises at least one first handling device for positioning and/or securely holding at least one workpiece in a working region of a shaping machine, and at least one second handling device for positioning and/or securely holding at least one workpiece in a working region of an additional processing machine. The at least one first handling device is provided for transferring the at least one workpiece to the at least one second handling device; and at least one positioning means is provided at the at least one second handling device for aligning the at least one workpiece in a predetermined (or predeterminable) position. At least one positioning means is provided at the at least one second handling device, which cooperates with at least one positioning aid on the at least one workpiece for aligning the at least one workpiece in a predetermined (or predeterminable) position.

The device is preferably suited, and preferably also designated, for carrying out the method according to the invention.

Implementations of the present invention are based on the concept of designing the overall process to operate more efficiently by directly transferring the workpiece between the handling devices. A further significant advantage of the method according to the invention is that great flexibility is achieved by the direct transfer of the workpiece. The workpiece may be transferred in any given position in space that is accessible by both handling devices. This may also be advantageous in particular for a rebuilding of the unit. One advantage of the device according to the invention, therefore, is that, as a result of economizing on a transfer step or a separate transfer device for the workpieces, it is possible to shorten the cycle times during manufacturing, and to conserve space in the machine work room. The at least one workpiece is now aligned in a predetermined (or predeterminable) position when it is received by the at least one second handling device with the assistance of at least one positioning means and the at least one positioning aid on the workpiece.

In cooperation with the positioning aid(s), the at least one positioning means on the receiving, i.e., the second, handling device thus allows the workpiece to be centered or aligned in a predetermined (or predeterminable) position for a defined and reproducible transfer. This could be achieved in the prior art only via a shell mold integrated into the deposit station. In the method according to the invention, each individual workpiece now is no longer precisely aligned before the workpiece is received; rather, alignment occurs during the receiving process by means of the second handling device. This also enables the workpiece to be precisely positioned in an additional processing machine.

The handling device is preferably designed as a freely movable industrial robot or at least one robotic arm that is movable in a defined radius or three-dimensional spatial region. However, the handling device may also be designed as a simple gripping system having only a very limited freedom of motion.

According to another aspect of the present invention, the at least one workpiece is transferred from at least one first gripping mechanism for the first handling device to at least one second gripping mechanism for the second handling device. The gripping mechanisms may preferably grip one or more workpieces simultaneously. Depending on the number of workpieces to be transferred, or the type of further machining processes or machines which follow, it may also be advantageous for one handling device to have multiple gripping mechanisms, which preferably may be moved independently of one another in various directions.

It is preferable for the at least one first and/or the at least one second gripping mechanism for transferring the at least one workpiece to be moved or movable into a transfer position by means of the particular handling device. In this transfer position, the gripping mechanism for the second handling device grasps the workpiece that is held by the first gripping mechanism, the first gripping mechanism preferably not releasing the workpiece until the second gripping mechanism has firmly gripped and aligned the workpiece. The at least one first gripping mechanism is therefore preferably movable, or readjustable, in the transfer position so that it can follow an aligning motion of the workpiece.

According to still another aspect, the shaping process is carried out in the shaping machine by at least one pair of tools that are movable relative to one another. The term "movable relative to one another" includes the case that only one of the two tools in the shaping machine is moved and the other tool is stationary, as well as the case that both tools of the pair are movably configured in the shaping machine. To this end, in a working region the at least one shaping machine preferably comprises at least two tools that are movable relative to one another for shaping at least one workpiece.

It can be particularly advantageous when at least one hollow mold tool is used for the shaping process that a peripheral burr is produced on the workpiece during the shaping process. The peripheral burr normally is composed of the material displaced from the hollow mold when the tools move toward one another and the workpiece is shaped.

To produce the positioning aid, the tool preferably is provided with the "negative" of at least one corresponding projection and/or at least one corresponding recess which is transferred as the "positive" to the workpiece during the shaping process. The positioning aid may be produced during shaping, using a hollow mold tool or a tool having at least one gravure on its impact side, or also during shaping by means of a tool without a gravure up to the point where the recess or projection for producing the positioning aid is located, or on the impact side of the flat tool.

The positioning aid preferably is provided on the at least one peripheral burr of a workpiece produced using a hollow mold tool. During further processing of the workpiece, the peripheral burr is then removed together with the positioning aid, for example in a deburring machine.

It is particularly advantageous when the positioning aid is provided on another side of the workpiece, in particular on the side of the workpiece opposite to the side on which the at least one gripping mechanism engages with the workpiece. Thus, there is enough space that the first gripping mechanism is able to securely hold the workpiece, and the second gripping mechanism is able to engage with the workpiece.

In one particularly advantageous embodiment, two positioning aids, in particular essentially conically shaped projections and/or recesses, are produced on the at least one workpiece. The two associated positioning means on the second handling device or on the gripping mechanism for the handling device then preferably have a corresponding conical design and cooperate with the positioning aids, particularly in the negative-positive design.

The at least one positioning aid preferably comprises at least one projection and/or at least one recess on the workpiece. The, or each, positioning aid(s) may in particular have a conical design, but may also have other designs.

It is particularly preferred when the at least one positioning aid is provided on a burr that is formed by the shaping process and that encloses the periphery of the workpiece.

To produce the positioning aid, at least one of the tools of the shaping machine that are movable relative to one another preferably comprises at least one projection and/or at least one recess. It is particularly preferred when at least one of the tools that are movable relative to one another is a hollow mold tool, and/or when the at least one projection and/or the at least one recess is provided on the tool outside a hollow mold at a predetermined (or predeterminable) distance from the hollow mold. In this manner the positioning aid is provided on the peripheral burr, and both can be disposed of in a further process step.

According to one particularly preferred aspect of the present invention, after shaping, the at least one first gripping mechanism grips the at least one workpiece at the peripheral burr on the workpiece produced during the shaping process. Thus, the workpiece can be tightly packed without causing significant damage to the workpiece surface.

During receiving, the at least one second gripping mechanism preferably grips the at least one workpiece on the side on which the at least one positioning aid is provided, in particular at the peripheral burr produced during the shaping process.

In one particularly advantageous embodiment, the at least one second gripping mechanism engages with the positioning aid via the positioning means corresponding to the positioning aid, and the workpiece is thereby aligned or capable of being aligned in the predetermined (or predeterminable) position during receiving.

The positioning aid and positioning means preferably are shaped in such a way that the workpiece cannot twist or slide when the positioning aid and positioning means are cooperating. For a rotationally symmetrical shape of the positioning aid, such as a conical shape, at least two positioning aids are preferably provided to avoid twisting of the workpiece in the handling device. Besides a conical shape, the positioning aid and the positioning means preferably may also have other shapes, including a pyramid, prism, cylinder, or an oblong burr or projection, or a groove or oblong recess.

In one particularly preferred embodiment, the at least one second handling device engages with two essentially conically shaped positioning aids on the workpiece by means of a gripping mechanism having two essentially conically shaped positioning means.

According to one preferred aspect, the at least one first and the at least one second gripping mechanism grip the at least one workpiece by at least one pair of gripping elements that are movable relative to one another. The at least one positioning means then is preferably provided at least on one of the gripping elements of the pair on the second gripping mechanism, in particular on the side of at least one gripping element facing the other gripping element. It is particularly preferred when the at least one positioning means is provided on one end of the gripping element.

In one advantageous embodiment, the at least one positioning means comprises at least one projection or at least one recess that corresponds to the positioning aid. The projection or recess may have a shape such as a pyramid, prism, cylinder, or an oblong burr or groove. The positioning means and positioning aid preferably engage with one another essentially in a positive friction fit. To this end, however, it is not always necessary for the positioning means and positioning aid to have the same shape, depending, for example, on the type of fixed bearing or movable bearing. Thus, for example, a projection with a conical or pyramidal shape may engage in a groove. In this case, however, for a precise alignment it would be advantageous for two conical or pyramidal projections on the gripping mechanism to engage in the groove.

For the device according to the invention, it is particularly preferred when the at least one additional processing machine is an additional shaping machine, for example a forging machine or a drop forging machine, or a deburring machine, in particular a deburring press.

According to one particularly preferred aspect, the at least one first gripping mechanism is provided for securely holding the at least one workpiece during the shaping process, and/or for moving the at least one workpiece in the shaping machine from one working region to at least one other working region, and/or for moving the at least one workpiece in the shaping machine from one shaping position to at least one other shaping position, and/or to position same in a shaping position.

It is also preferable when the at least one second gripping mechanism positions the at least one workpiece in the processing machine, and/or securely holds same in the processing machine during a further machining process.

In the device according to the invention, each of the handling devices preferably includes at least one drive device, each having at least one electric motor.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Corresponding parts and variables are provided with the same reference numbers in FIGS. 1 through 5. Understanding that these drawings depict only typical embodiments of the invention and are not therefore to be considered to be limiting of its scope, the invention will be described and explained with additional specificity and detail through the use of the accompanying drawings in which.

LIST OF REFERENCE NUMBERS

Elements of the Figures shown or described herein are listed as follows.

| | |
|---|---|
| 1 | Workpiece |
| 2 | Drop forging machine |
| 3 | Deburring machine |
| 4 | Device for transferring a workpiece |
| 5 | First handling device |
| 6 | Second handling device |
| 7 | Swivel arm |
| 8, 9 | Additional handling devices |

-continued

| | |
|---|---|
| 10 | Transfer position |
| 11 | Working region |
| 12 | Conveying unit |
| 13 | Positioning aid |
| 14 | Gripping elements |
| 15 | First gripping mechanism |
| 16 | Second gripping mechanism |
| 17 | Shell mold |
| 18, 19 | Gripping mechanisms |
| 20 | Peripheral burr |
| 21 | Square profile |
| 22 | Lower gripping element |
| 23 | Upper gripping element |
| 24 | Interior side |
| 25 | Component |
| 26 | Positioning means |
| 27 | Component |
| 28 | Tool |
| 29 | Hollow mold |
| 30 | Recess |
| L | Longitudinal axis |

DETAILED DESCRIPTION OF THE PREFERRED EMBODIMENTS

Figure 1:
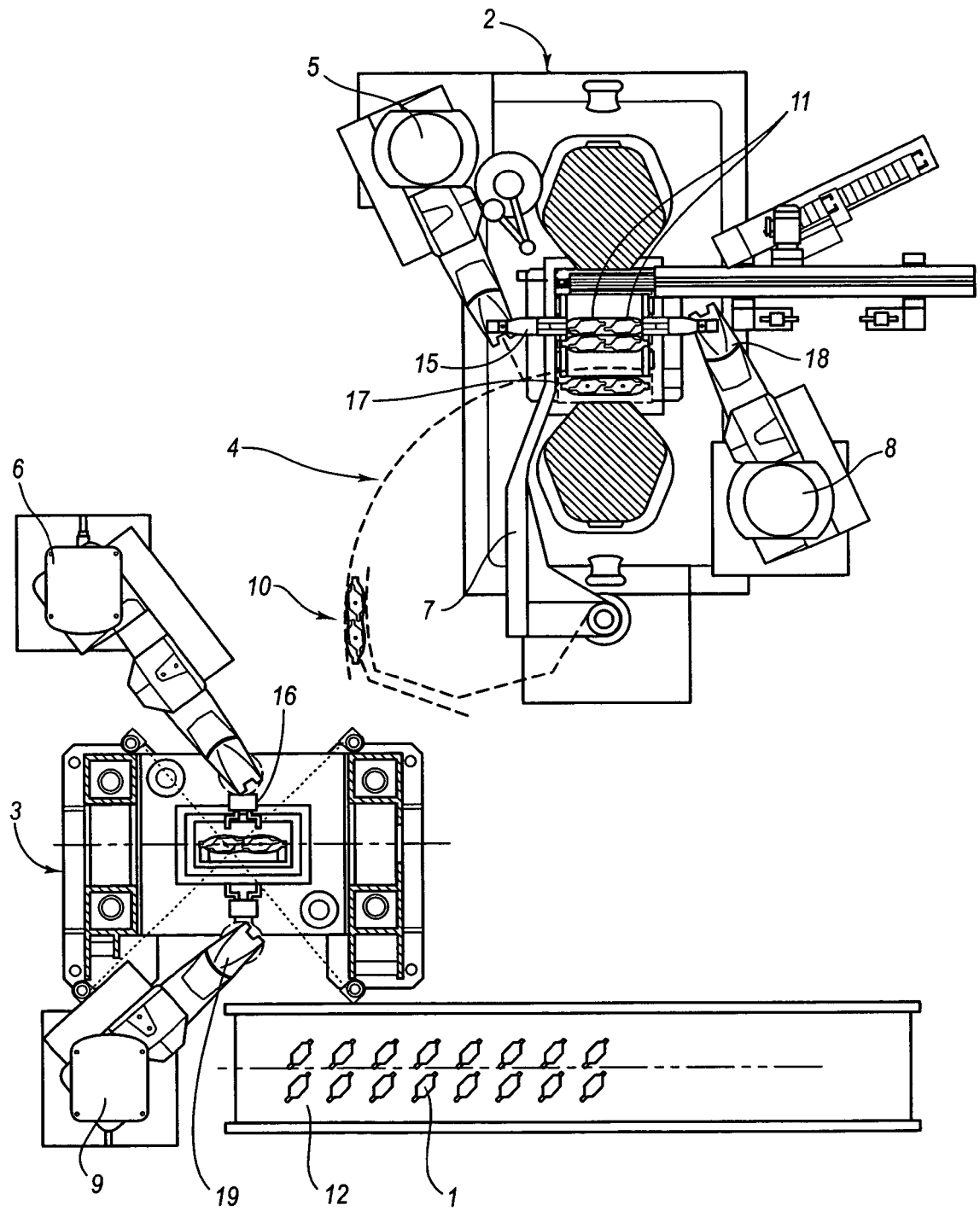
FIG. 1 shows a device for transferring workpieces from a shaping device according to the prior art.
Figure 2:
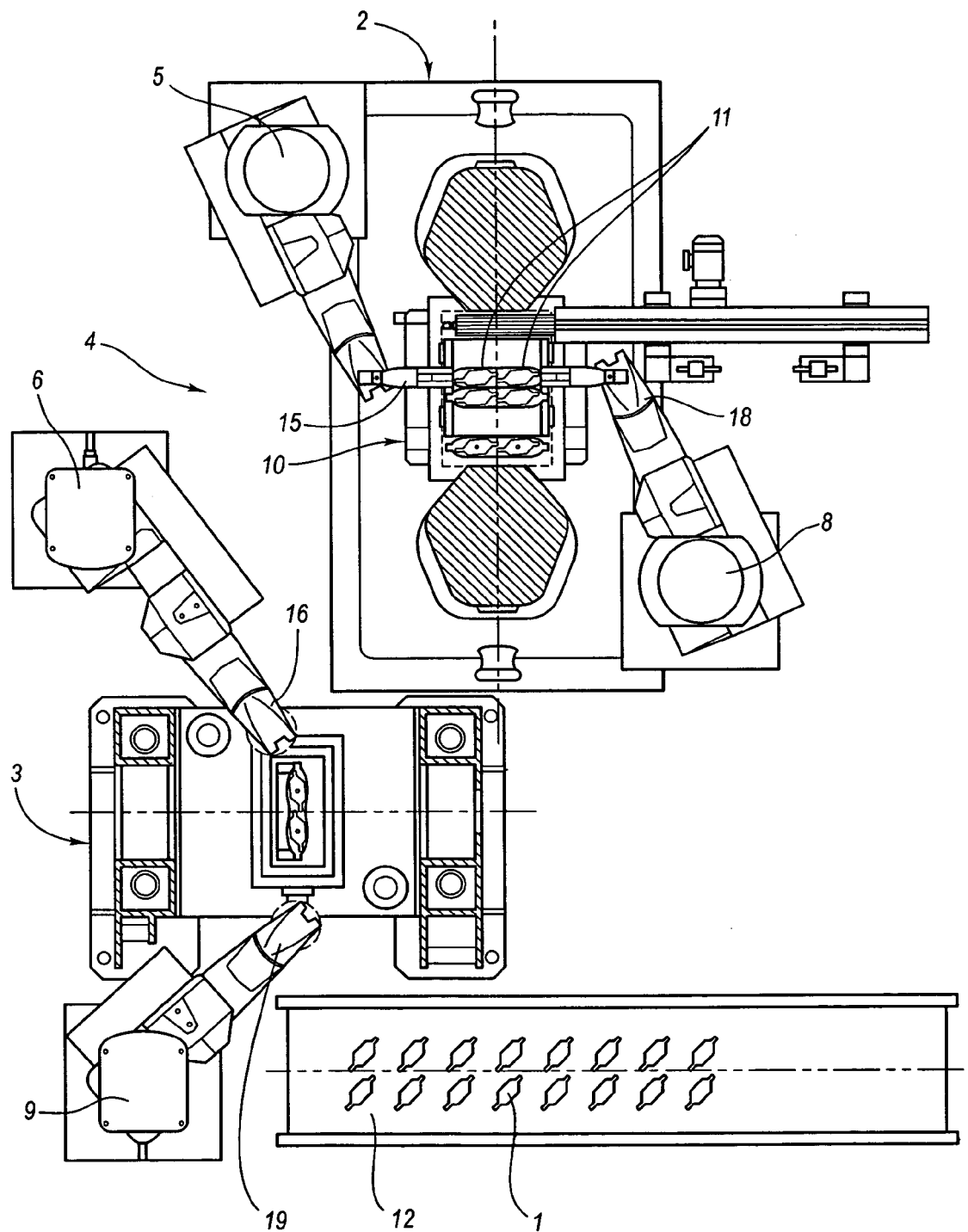
FIG. 2 shows an advantageous embodiment of a device according to the invention for transferring workpieces from a shaping device.

FIG. 1 and FIG. 2 show a partial region of a metal processing unit, which implements the work steps of shaping a workpiece 1 in a shaping machine which is designed as a drop forging machine 2, in particular a forging hammer; and the work step of deburring of the workpiece in a deburring machine 3, in particular a deburring press. A device 4 for transferring workpieces 1 from the drop forging machine 2 to the deburring machine 3 is also provided in the working region of the shaping unit.

As shown in the conventional device illustrated by FIG. 1, the device 4 for transferring the workpieces 1 comprises a first handling device 5 having a first gripping mechanism 15 and a second handling device 6 having a second gripping mechanism 16. A swivel arm 7 is also provided which comprises multiple shell molds 17 for inserting the forged workpieces 1, and which can be swiveled into a transfer position 10 via a swivel motion.

For the forging process, workpieces 1 are supplied to the drop forging machine 2 by means of an additional handling device 8. A gripping mechanism 18 on the additional handling device 8 is provided for picking up the workpieces 1 from a conveying unit, and placing them in a forging die of a working region 11 of the drop forging machine 2. The handling device 8 and/or the gripping mechanism 18 may also be designated for securely holding one of the workpieces 1 during the forging process.

The first handling device 5 and/or the first gripping mechanism 15 may also be used for securely holding a workpiece 1 during the forging process in a working region 11 of the drop forging machine 2. Furthermore, the first handling device may be provided for moving the workpiece between working regions 11 of the drop forging machine 2 and/or in various shaping positions. When the forging process is completed, the handling device 5, with the assistance of the gripping mechanism 15, removes the workpiece(s) 1 from the corresponding working region 11, and positions it/them in the shell mold 17 of the swivel arm 7 for transfer to the deburring machine 3. For this purpose, the gripping mechanism preferably grips the workpiece 1 at a burr 20 that encloses the periphery of the workpiece 1, and was produced during the forging process in the drop forging machine 2 (see the description of FIG. 5). The swivel arm 7 together with the workpiece(s) is then swiveled in space into the transfer position 10.

The second handling device 6 is designed to be movable into the transfer position 10, in which it selectively removes the workpiece(s) 1 from the shell mold 17 of the swivel arm by means of the second gripping mechanism 16, and then feeds the workpiece(s) to the deburring machine 3. The fact that the workpiece(s) 1 lie(s) in the shell mold 17 during the transfer always ensures a uniform alignment of the workpiece(s) 1. If the second gripping mechanism 16 now grips the workpiece 1 in the shell mold 17, the workpiece may be inserted in a predetermined (or predeterminable) position in the deburring machine 3, regardless of geometric deviations in the external shape of the workpiece 1. These geometric deviations can depend, among other factors, on the thickness with which the peripheral burr 20 was provided at various locations around the workpiece 1. Very precise positioning is required, particularly in a deburring press 3, to prevent damage to the workpiece 1 when the burr 20 is removed. The workpieces 1 are then likewise grasped from the deburring machine 3 by an additional handling device 9 or the gripping mechanism 19 thereof, lifted, and placed on a conveying unit 12 for transporting the workpieces 1.

FIG. 2 illustrates a partial region of a metal processing unit comprising a device 4 according to the invention for transferring at least one workpiece from a drop forging machine 2 to a deburring machine 3. The process sequence in FIG. 2 essentially corresponds to the process described in conjunction with FIG. 1. In this case, the only difference is in the device 4 for transferring the workpieces 1.

The workpieces 1 are supplied to the forging process, and taken from the deburring press 3 as previously described, using the handling devices 8 and 9 and the gripping mechanisms 18 and 19 thereof. The first handling device 5 once again is provided for securely holding a workpiece during the forging process and, if desired, for moving same from one working region 11 to another working region 11 in the drop forging machine 2, or to place the workpiece in another shaping position.

When the forging process is completed, the first handling device 5 removes the at least one workpiece 1 from the drop forging machine 2. To this end, the first gripping mechanism grips the workpiece 1 and lifts it from the forging die in the working region 11. The handling device 5 then moves the gripping mechanism 15 together with the workpiece 1 into a transfer position 10, in which the gripping mechanism 16 of the second handling device 6 can be moved as well. In the transfer position, the at least one workpiece 1 is then directly transferred from the first handling device 5 to the second handling device 6 via a so-called "handshake" of the handling devices 5, 6. The exact alignment of the workpiece 1 during this transfer is achieved using positioning means 26 on the gripping mechanism 16 for the second handling device 6. Thus, compared to the device 4 illustrated in FIG. 1, the process step of transferring via a swivel arm 7 may be omitted, enabling the workpieces to be transferred between the machines even more quickly and efficiently.

Figure 3:
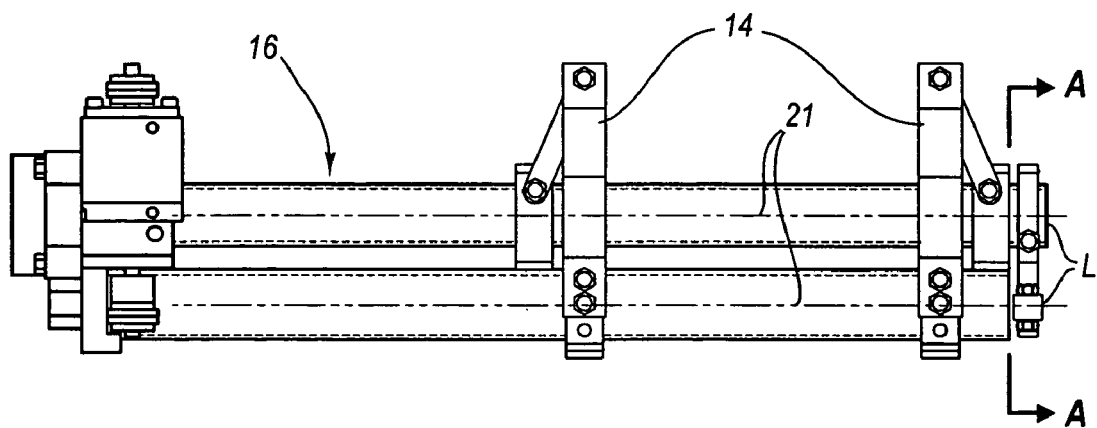
FIG. 3 shows a gripping mechanism for the device according to FIG. 2.
Figure 4:
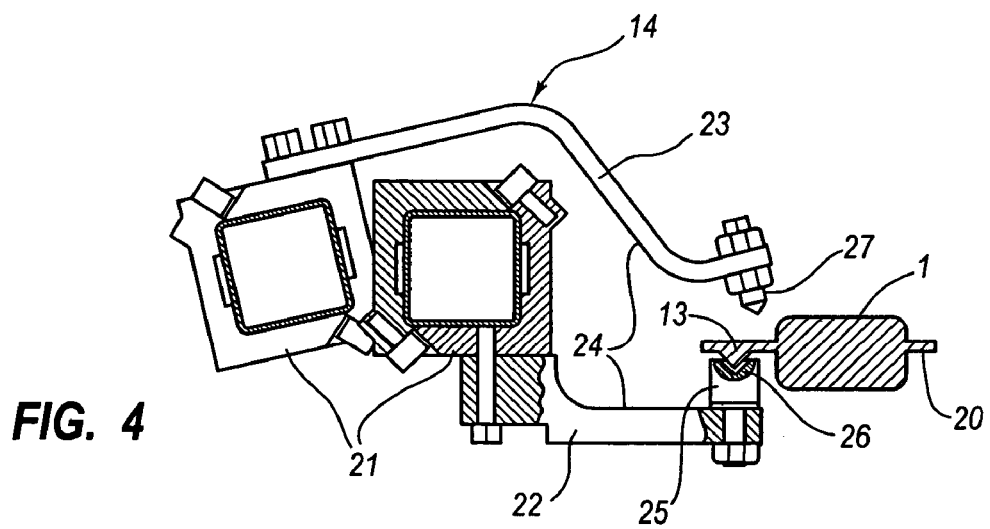
FIG. 4 shows a sectional illustration of the gripping mechanism according to FIG. 3, along the line A-A.

FIG. 3 and FIG. 4 illustrate an embodiment of a second gripping mechanism 16 for the second handling device 6. The gripping mechanism 16 comprises two pairs of gripping elements 14. The gripping elements 14 of a pair are each situated on square profiles 21 running in parallel. The gripping elements 14 are thus aligned in the same direction, orthogonal to a longitudinal axis L of the square profiles 21. By rotating at least one of the square profiles 21 about its longitudinal axis L, the gripping elements 14 of a pair may be moved toward or away from one another. Each of the gripping element pairs 14 comprises at least one positioning means 26, so that the gripping mechanism 16 as a whole has at least two positioning means 26.

FIG. 4 shows a sectional illustration of the gripping mechanism 16 according to FIG. 3 along the line A-A. Only one pair of gripping elements 14 is seen in this view. A lower gripping element 22 in the shape of a straight rod is attached to a square profile 21. An upper gripping element 23 is attached to the other square profile 21 and is shaped such that it extends over the square profile 21 that supports the lower gripping element 22, and at one free end is able to contact a free end of the lower gripping element 22.

A positioning means 13 is provided at its free end on an interior side 24 of the lower gripping element. The positioning means 26 is designed as a conically shaped recess on one side of a cylindrical component 25 facing the upper gripping element 23. FIG. 4 also shows a schematic view of a workpiece 1 having a positioning aid 13, corresponding to the positioning means 26, in the shape of a conical projection. The positioning aid 13 is located on the burr 20 enclosing the periphery of the workpiece 1.

If the gripping elements 14 for the second handling device 6 now grip the workpiece at the peripheral burr 20 on the side on which the positioning aids 13 are provided, the positioning aid 13 is picked up by the positioning means 26, and the upper gripping element 23 firmly clamps the workpiece 1. The corresponding conical shapes of the positioning aid 13 and positioning means 26 ensure that the positioning aid 13 and positioning means 26 automatically slide into one another due to the pressure exerted by the upper gripping element 23, even if the gripping mechanism 16 does not always precisely grip the workpiece 1. Since two pairs of gripping elements 14 that have positioning means 26 are provided, which engage in two positioning aids 13 on the workpiece 1, the workpiece 1 is held in a rotationally rigid manner.

In the exemplary embodiment illustrated, the upper gripping element 23 at its free end on the interior side 24 likewise includes a component 27 terminating in a conical shape. This component 27 may be provided for either transmitting a pressing force to the workpiece 1 for securely holding same, or for use as an additional positioning means 13 when the positioning aid has a corresponding geometric shape, such as a hollow cone. Furthermore, it may be advantageous when the positioning aid 13 is designed not as an individual truncated cone, but instead as a continuous burr having a triangular cross section on the peripheral burr 20. The positioning means 13 on the lower gripping element 22 must then be designed as a groove having a corresponding triangular cross section.

Figure 5:
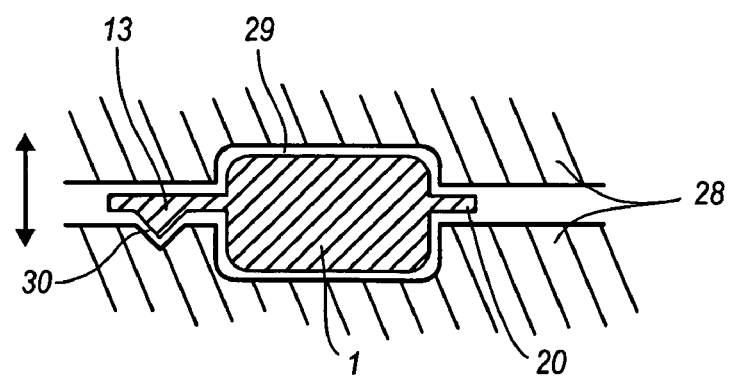
FIG. 5 shows an illustration of a shaping process in a shaping device.

FIG. 5 schematically illustrates the process for producing a positioning aid 13. During the shaping process in the drop forging machine 2, two hollow mold tools 28 are moved toward one another, and a workpiece blank inserted between the tools 28 is pressed into the desired shape. During this process, excess material is pressed out beyond the edge of the hollow molds 29 of the tools 28, forming a peripheral burr 20 on the workpiece 1. One of the workpieces has a corresponding depression 30, which is outside the hollow mold 29, and separated at a distance therefrom, and is in the shape of the desired positioning aid 13 in which the material displaced during the shaping process now likewise wells up. In this manner, the positioning aid 13 for transferring the workpiece 1 to the subsequent processing machine can be provided at the same time that the workpiece 1 is shaped. Depending on the desired shape of the positioning aid, the second tool may also include a corresponding recess or a corresponding projection on its pressing surface.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A method for transferring workpieces comprising:
   positioning at least one workpiece in a working region of a shaping machine;
   transferring the at least one workpiece with at least one first handling device from the shaping machine to at least one second handling device after at least one shaping process in the shaping machine; and
   producing at least one positioning aid on the workpiece during the at least one shaping process, wherein the produced positioning aid cooperates with at least one corresponding positioning means of a gripping mechanism of the second handling device.

2. The method as recited in claim 1, further comprising aligning the at least one workpiece in a predetermined or predeterminable position when the at least one workpiece is received by the at least one second handling device with the assistance of the at least one positioning means and the at least one positioning aid.

3. The method as recited in claim 1, further comprising one or more of:
   (i) transferring the at least one workpiece from at least one first gripping mechanism of the first handling device to at least one second gripping mechanism of the second handling device; or
   (ii) moving any one or more of the at least one first gripping mechanism of the first handling device, or the at least one second gripping mechanism of the second handling device, into a transfer position for transferring the at least one workpiece by means of the corresponding first or second handling device.

4. The method as recited in claim 3, further comprising any one or more of:
   (i) gripping the at least one workpiece with the second gripping mechanism of the at least one second handling device while the at least one workpiece is held by the first gripping mechanism; or
   (ii) releasing the at least one workpiece from the first gripping mechanism when the at least one workpiece is aligned in the second gripping mechanism.

5. The method as recited in claim 1, wherein the at least one shaping process in the shaping machine is carried out using at least one hollow mold, and carried out by at least one pair of tools that are movable relative to one another, wherein a peripheral burr is produced on the at least one workpiece during the at least one shaping process.

6. The method as recited in claim 1, wherein the produced at least one positioning aid comprises at least one projection and/or at least one recess.

7. The method as recited in claim 1, wherein any one or more of the at least one positioning aid or at least one or each positioning means is rotationally symmetrical, and has the design of a cone, cylinder, prism, pyramid, or oblong burr or groove.

8. The method as recited in claim 1, further comprising:
   providing the at least one positioning aid on one or more peripheral burrs on the at least one workpiece; and removing the at least one positioning aid and the one or more peripheral burrs from the at least one workpiece after transferring the at least one workpiece to the at least one second handling device.

9. The method as recited in claim 1, further comprising providing the at least one positioning aid on a side of the at least one workpiece that opposes a side on which at least one first gripping mechanism engages the workpiece.

10. The method as recited in claim 1, further comprising producing, during the at least one shaping process, at least two positioning aids on the at least one workpiece, wherein the at least two positioning aids cooperate and/or engage two corresponding positioning means on at least one gripping mechanism for the at least one second handling device.

11. The method as recited in claim 1, further comprising any one or more of:
   gripping the at least one workpiece, after shaping, at a peripheral burr on the workpiece produced during the at least one shaping process with at least one first gripping mechanism; or
   gripping the at least one workpiece, during receiving, with the at least one second gripping mechanism on a side of the at least one workpiece on which the at least one positioning aid is provided.

12. The method as recited in claim 1, further comprising any one or more of:
   (i) engaging, with the at least one second gripping mechanism, the at least one positioning aid via the corresponding at least one positioning means, whereby the workpiece is aligned or capable of being aligned in a predetermined or predeterminable position during receiving;
   (ii) shaping the at least one positioning aid wherein the at least one workpiece avoids twisting or sliding when the at least one positioning aid and at least one positioning means are cooperating; or
   (iii) positioning the at least one positioning aid and the at least one positioning means wherein the at least one workpiece avoids twisting or sliding when the at least one positioning aid and at least one positioning means are cooperating.

13. The method as recited in claim 1, further comprising:
   gripping, with a first or second gripping mechanism, the at least one workpiece using first and second gripping elements that are movable relative to one another;
   wherein the at least one positioning means is provided on at least one of the first and second gripping elements on the first or second gripping mechanism.

14. The method as recited in claim 1, further comprising the at least one first handling device performing any one or more of:
   (i) securely holding the at least one workpiece during the at least one shaping process;
   (ii) moving the at least one workpiece in the shaping machine from one working region to at least one other working region; or
   (iii) positioning the at least one workpiece in the shaping machine from one shaping position to at least one other shaping position.

15. The method as recited in claim 1, further comprising the at least one second handling device performing any one or more of:
   (i) positioning the at least one workpiece in a processing machine; or
   (ii) securely holding the at least one workpiece in the processing machine during a further machining process.

16. The method as recited in claim 3, wherein the first and second gripping mechanisms each comprise at least one pair of gripping elements that are movable relative to one another for gripping the at least one workpiece;
   wherein the at least one positioning means is provided on any one or more of:
   (i) on the gripping elements for the second gripping mechanism; or
   (ii) on at least one of a plurality of mutually facing interior sides of the at least one pair of gripping elements on at least one end thereof.

17. The method as recited in claim 1, wherein the shaping machine is a forging machine.

18. The method as recited in claim 1, wherein the shaping machine is a drop forging machine.

19. A method for transferring workpieces comprising:
   positioning at least one workpiece in a working region of a shaping machine with at least one first handling device, wherein the at least one workpiece is securely held;
   subsequently transferring the at least one workpiece to at least one second handling device after at least one shaping process in the shaping machine;
   producing at least one positioning aid during the at least one shaping process, wherein the produced positioning aid cooperates with at least one corresponding positioning means of a gripping mechanism of the second handling device; and
   one or more of:
   (i) transferring the at least one workpiece from at least one first gripping mechanism of the first handling device to at least one second gripping mechanism of the second handling device; or
   (ii) moving any one or more of the at least one first gripping mechanism of the first handling device, or the at least one second gripping mechanism of the second handling device, into a transfer position for transferring the at least one workpiece by means of the corresponding first or second handling device.

20. The method as recited in claim 19, further comprising any one or more of:
   i. gripping the at least one workpiece with the second gripping mechanism of the at least one second handling device while the at least one workpiece is held by the first gripping mechanism; or
   ii. releasing the at least one workpiece from the first gripping mechanism when the at least one workpiece is aligned in the second gripping mechanism.

21. A method for transferring workpieces comprising:
   positioning at least one workpiece in a working region of a shaping machine with at least one first handling device, wherein the at least one workpiece is securely held;
   subsequently transferring the at least one workpiece to at least one second handling device after at least one shaping process in the shaping machine; and
   producing at least one positioning aid during the at least one shaping process, wherein the produced positioning aid cooperates with at least one corresponding positioning means of a gripping mechanism of the second handling device;
   wherein the at least one shaping process in the shaping machine is carried out using at least one hollow mold, and carried out by at least one pair of tools that are movable relative to one another, wherein a peripheral burr is produced on the at least one workpiece during the at least one shaping process.

22. A method for transferring workpieces comprising:
positioning at least one workpiece in a working region of a shaping machine with at least one first handling device, wherein the at least one workpiece is securely held;
subsequently transferring the at least one workpiece to at least one second handling device after at least one shaping process in the shaping machine;
producing at least one positioning aid during the at least one shaping process, wherein the positioning aid cooperates with at least one positioning means of the second handling device; and
the at least one first handling device performing any or more of:
(i) securely holding the at least one workpiece during the at least one shaping process;
(ii) moving the at least one workpiece in the shaping machine from one working region to at least one other working region; or
(iii) positioning the at least one workpiece in the shaping machine from one shaping position to at least one other shaping position.

23. A method for transferring workpieces comprising:
positioning at least one workpiece in a working region of a shaping machine with at least one first handling device, wherein the at least one workpiece is securely held;
subsequently transferring the at least one workpiece to at least one second handling device after at least one shaping process in the shaping machine;
producing at least one positioning aid during the at least one shaping process, wherein the positioning aid cooperates with at least one positioning means of the second handling device; and
providing the at least one positioning aid on side of the at least one workpiece that opposes a side on which at least one first gripping mechanism engages the workpiece.

24. A method for transferring workpieces comprising:
positioning at least one workpiece in a working region of a shaping machine with at least one first handling device, wherein the at least one workpiece is securely held;
subsequently transferring the at least one workpiece to at least one second handling device after at least one shaping process in the shaping machine;
producing at least one positioning aid during the at least one shaping process, wherein the positioning aid cooperates with at least one positioning means of the second handling device; and
producing, during the at least one shaping process, at least two positioning aids on the at least one workpiece, wherein the at least two positioning aids cooperate and/or engage two corresponding positioning means on at least one gripping mechanism for the at least one second handling device.

25. A method for transferring workpieces comprising:
positioning at least one workpiece in a working region of a shaping machine with at least one first handling device, wherein the at least one workpiece is securely held;
subsequently transferring the at least one workpiece to at least one second handling device after at least one shaping process in the shaping machine;
producing at least one positioning aid during the at least one shaping process, wherein the positioning aid cooperates with at least one positioning means of the second handling device; and
the at least one second handling device performing any one or more of:
(i) positioning the at least one workpiece in a processing machine; or
(ii) securely holding the at least one workpiece in the processing machine during a further machining.

26. A method for transferring workpieces comprising:
positioning at least one workpiece in a working region of a shaping machine with at least one first handling device, wherein the at least one workpiece is securely held;
subsequently transferring the at least one workpiece to at least one second handling device after at least one shaping process in the shaping machine;
producing at least one positioning aid during the at least one shaping process, wherein the positioning aid cooperates with at least one positioning means of the second handling device; and
one or more of:
(i) engaging, with at least one gripping mechanism, the at least one positioning aid via the corresponding at least one positioning means, whereby the workpiece is aligned or capable of being aligned in a predetermined or predeterminable position during receiving;
(ii) shaping the at least one positioning aid wherein the at least one workpiece avoids twisting or sliding when the at least one positioning aid and at least one positioning means are cooperating; or
(iii) positioning the at least one positioning aid and the at least one positioning means wherein the at least one workpiece avoids twisting or sliding when the at least one positioning aid and at least one positioning means are cooperating.

27. A method for transferring workpieces comprising:
positioning at least one workpiece in a working region of a shaping machine with at least one first handling device, wherein the at least one workpiece is securely held;
subsequently transferring the at least one workpiece to at least one second handling device after at least one shaping process in the shaping machine;
producing at least one positioning aid during the at least one shaping process, wherein the positioning aid cooperates with at least one positioning means of the second handling device; and
gripping, with a first or second gripping mechanism, the at least one workpiece using first and second gripping elements that are movable relative to one another;
wherein the at least one positioning means is provided on at least one of the first and second gripping elements on the first or second gripping mechanism.

* * * * *